Aug. 6, 1957 S. C. LOCKHART 2,801,712
BRAKE DEFLECTION COMPENSATOR
Filed Aug. 24, 1955
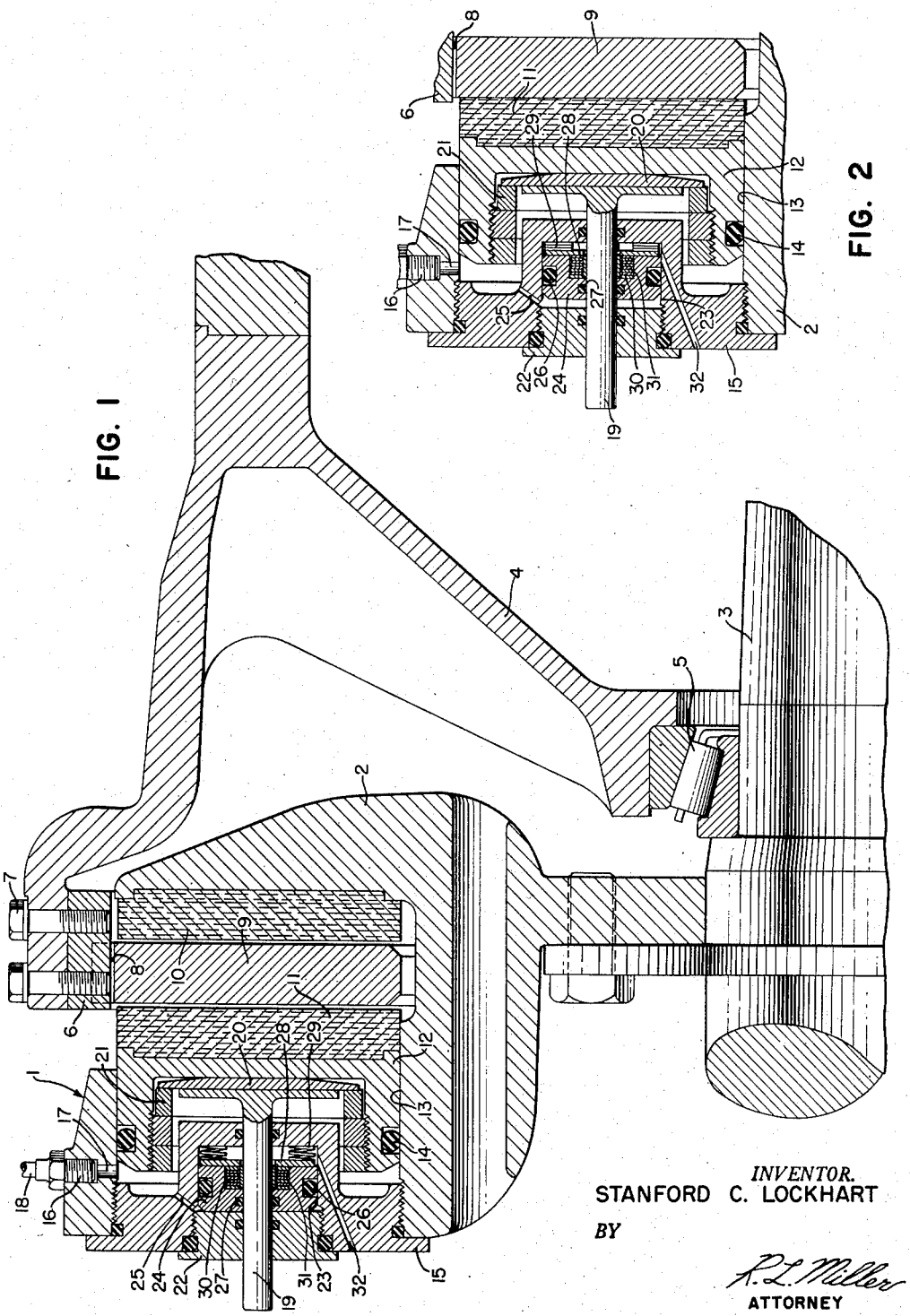
*INVENTOR.*
STANFORD C. LOCKHART
BY
*P. L. Miller*
ATTORNEY

United States Patent Office 2,801,712
Patented Aug. 6, 1957

2,801,712

BRAKE DEFLECTION COMPENSATOR

Stanford C. Lockhart, Akron, Ohio, assignor to The Goodyear Tire & Rubber Company, Akron, Ohio, a corporation of Ohio Application August 24, 1955, Serial No. 530,240

9 Claims. (Cl. 188—72)

This invention relates to brakes, especially to a brake construction having specialized clearance provision means provided therein for operation when the brake is in its released condition.

Heretofore there have been various types of brakes proposed and certain of these brakes have had what is called automatic adjustment pins built therein to aid in compensating in the brake for wear on the brake lining means. Also, such brakes frequently have spring units provided therein for returning the brake lining means to a clearance or inoperative position upon release of braking pressure. In brakes of this type, upon brake application, frequently there is a springing apart of the components of the brake housing due to the pressure set up therein when the brake is actuated, and/or the brake disc on which the braking action is produced may be flattened from a dished or wavy condition produced through wear and use of the brake disc. Thus sometimes brake constructions do not become completely inoperative even when released because of the relatively long movement required in the brake means to provide brake action, and the failure to release all of the forces built up in the brake when it is actuated.

The general object of the present invention is to provide a new and improved brake construction characterized by its ability to reabsorb springing and flattening movement of the braking mechanism required to produce braking action before operation of the clearance provision means in the brake.

Another object of the invention is to use special piston means in a brake wherein an auxiliary piston is provided to set up the braking clearance in the brake when released.

Another object of the invention is to correlate the operative forces exerted by a return spring in a brake construction with relation to the frictional grip forces exerted by a grip member on an automatic adjustment pin in the brake assembly, and to have predetermined relative action based on such forces.

A further object of the invention is to provide an uncomplicated, improved, sturdy type of a brake having two independent pistons therein, both pistons being operated by the hydraulic brake pressure fluid.

The foregoing and other objects and advantages of the invention will be made more apparent as the specification proceeds.

For a better understanding of the invention, reference now is directed to the accompanying drawings, wherein:

Fig. 1 is a vertical section of a brake and wheel assembly including a brake embodying the principles of the invention; and Fig. 2 is a fragmentary section of the braking means of Fig. 1 shown in operative position.

When referring to corresponding parts shown in the drawings and referred to in the specification, corresponding numerals are used to facilitate comparison between such parts.

The invention in general relates to a brake construction comprising a brake housing having a brake cylinder therein, a brake piston operatively positioned in the brake cylinder, an automatic adjustment pin secured to and movable with the brake piston, means forming an auxiliary chamber adjacent the outer end of the brake cylinder, which chamber has its axially outer end connected to the brake cylinder, the automatic adjustment pin extending through the auxiliary chamber, an auxiliary piston slidably received in the auxiliary chamber, friction grip means on the auxiliary piston engaging the automatic adjustment pin in the auxiliary chamber to limit axially inward movement thereof by engaging stop means provided in the brake construction, and spring means engaging the auxiliary piston to oppose movement thereof axially inwardly of the brake but to yield resiliently on initial application of braking forces and to remain in compressed condition until all movement of the brake components to and from braking position has been accomplished after which the springs extend to normal released position and provide operating clearance in the brake construction.

Reference now is particularly directed to the details of the construction shown in the drawings, and a brake embodying the principles of the invention is indicated as a whole by the numeral 1. This brake 1 is associated with a conventional brake housing 2 secured to an axle 3 on which a wheel 4 is journaled by a conventional bearing 5.

Fig. 1 of the drawings best indicates that a plurality of keys 6 are secured to the wheel 4 by screws 7 and protrude inwardly from an edge portion thereof for engaging slots 8 provided in the periphery of a brake disc 9 which thus is secured to and rotates with the wheel 4.

A spot type of a brake lining 10, for example, is suitably secured to one portion of the brake housing 2 adjacent the brake disc 9, whereas a second spot type of a brake lining 11 is secured to and moves with a portion of the brake 1 as hereinafter explained in more detail.

On brake application, the brake lining positioning means, hereinafter described, for the brake lining 11 moves it along the axis of the axle 3 to press against the brake disc 9 and move the brake disc axially into engagement with the brake lining 10 so that both brake linings 10 and 11 engage opposed surfaces of the brake disc for braking action thereon.

The details of the brake 1 include a brake piston 12 received in a brake cylinder 13 for operative movement there along. The brake piston 12 has the brake lining 11 suitably secured thereto and movable therewith. A conventional O-ring 14 is carried by the brake piston 12 in a recess in the periphery thereof for sealing the brake piston 12 in the cylinder 13. A suitable cap means, such as a cap 15, is secured to the outer end of the brake cylinder 13 to complete the cylinder. A conventional fitting 16 connects to the brake housing 2 and to a bore 17 provided in the brake housing, which bore extends to the axially outer end of the brake cylinder 13 and has a conduit 18 connected thereto for supply of hydraulic pressure fluid thereto for causing actuation of the brake 1. Such conduit 18 connects to any conventional brake operating means, such as the master cylinder of a hydraulic brake system.

An automatic adjustment pin 19 is provided in the brake 1 and it extends through the cap 15. Preferably this automatic adjustment pin 19 has a head or piston 20 provided on the inner end thereof, which head is secured to the brake piston 12 by means of a plurality of lock and spacer rings 21. The automatic adjustment pin 19 and the piston 12 are secured together for unitary movement with substantially no clearance being provided therebetween.

As an important feature of the invention, a secondary cap means or closure disc 22, is provided. This closure disc 22 is shown in threaded engagement with the cap 15, which is of generally cup shape in section, and the closure disc 22 seals or closes the outer end of such cap to provide an auxiliary chamber 23 therein. The drawing clearly shows that the automatic adjustment pin 19 extends through the auxiliary chamber 23 in the brake 1 and an auxiliary piston 24 is slidably and operably positioned in such chamber. A bore 25 is provided in the cap 15 for connecting the brake cylinder 13 to the auxiliary chamber 23 at the axially outer end thereof. Suitable clearance is provided at the outer end of the auxiliary piston for flow of hydraulic pressure fluid intermediate such piston and the adjacent portion of the closure disc 22 when the brake 1 is actuated.

The auxiliary piston 24 is sealed with relation to the cap 15 by a conventional O-ring 26 and is sealed with relation to the automatic adjustment pin 19 by a similar O-ring 27. The axially inner end of the auxiliary piston 24 bears against a conventional metal washer or disc 28 and the opposite face of such disc 28 engages a spring 29 compressed between such disc 28 and the adjacent wall or inner end portion of the auxiliary chamber 23.

When the brake 1 is in its inoperative position, the auxiliary piston 24 abuts against the axially outer end of the auxiliary chamber 23 and the spring 29 is extended. Upon braking movement, the spring 29 is compressed slightly and such compressional force, being stored in the spring, is used for providing operating clearance in the brake 1 when it is released. The compression force set up on the spring 29 by normal braking movement of the auxiliary piston 24 and the brake piston 12, with which the auxiliary piston 24 is operatively associated as hereinafter explained, forms a feature of the present invention.

Another important element in the brake 1 resides in a frictional grip means 30 used to control movement of the automatic adjustment pin 19. Such friction grip means 30 may comprise, for example, a plurality of circumferentially split resilient gripping rings engaging a split member on the periphery of the automatic adjustment pin 19, as indicated. Such frictional grip means 30 are received in a recess 31 provided in the axially inner end of the auxiliary piston 24. Upon brake actuation, the piston 12, pin 19, auxiliary piston 24 and frictional grip means 30 move axially to the right (Fig. 2) compressing spring 29. If the brake is not adequately applied within the limits of compression of spring 29, then pin 19 must slide through frictional grip means 30. For example, if under the braking load, should the C-shaped frame constituting the brake housing 2 spring towards a more open position, and/or should it be necessary to flatten the brake disc 9 before effecting good braking action thereon, further movement of both the brake piston 12 and the pin 19 is produced by the hydraulic pressure fluid supplied to the brake through the conduit 18. Such additional movement of the brake piston 12 forces the automatic adjustment pin 19 to be pulled through the frictional grip means 30 until such movement allows the desired braking action.

It can be stated that usually objectionable springing open of the C-shaped housing 2 and/or flattening of a dished brake disc 9 does not occur until pressures of more than 300 pounds per square inch are applied to the hydraulic fluid. However, in many brake installations or stops, hydraulic fluid pressures considerably in excess of 300 p. s. i. are employed.

Assuming with the structure of the present invention that 300 p. s. i. on the hydraulic fluid has been considerably exceeded in a given stop and that pin 19 has moved partially through friction grip means 30 with spring 29 fully compressed, all as stated above, to allow high braking force to be applied by brake linings 10 and 11 to the disc 9. Now, the brake pedal is released and the pressure in the hydraulic fluid behind the piston 12 begins to decay. However, the sprung open C-shaped housing and/or the flattened disc 9 tending to return to its dished shape maintains a gradually diminishing pressure on the piston 12 and thus on the hydraulic fluid behind piston 12 and behind auxiliary piston 24. As long as the fluid pressure is above about 300 p. s. i. the auxiliary piston 24 is held to the right (Fig. 2) and the return movement of piston 12 to the left (Fig. 1) pushes pin 19 back to the left through friction grip means 30.

The stated movement of pin 19 through friction grip 30 continues until the fluid pressure drops below about 300 p. s. i. (at which time substantially all of the deflection is out of housing 2 and disc 9) whereupon auxiliary piston 24 moves to the left with pin 19 to return the parts to the position of Fig. 1 and to re-establish normal brake clearance under the influence of spring 29.

The relation of parts is such in the present invention that the gripping force of the friction grip means 30 is greater than the force required to compress the spring 29 (whereby the parts move to the position of Fig. 2 before the pin 19 slides to the right through gripping means 30 upon brake application). Also, about 300 p. s. i. applied to the left of auxiliary piston 24 provides a greater force than the combined forces of friction grip means 30 and spring 29 (whereby the parts are held in the position of Fig. 2 as pin 19 slides left through friction grip means 30 until objectional deflection is removed from housing 2 and/or disc 9).

An air vent 32 is provided in the cap 15 to connect to the axially inner end of the auxiliary chamber 23.

From the foregoing, it will be seen that a relatively simple wear and deflection-compensating brake has been provided by the invention. It will be noted that the multiple pistons, both actuated from a common hydraulic pressure source, provide a brake which has a definite brake clearance provided therein when the brake is released and all resilient deflections stored in the brake housing, etc., upon brake actuation are transmitted back to the movable complements of the brake prior to the clearance movement of the brake piston 12. Thus, it is believed that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In a brake, a brake housing having a brake cylinder therein, a brake piston slidably received in said brake cylinder, a generally cup shaped cap secured to said housing to close an end of said brake cylinder, means for setting up hydraulic pressure in said brake cylinder, a brake adjustment pin extending through a base of said cap, means securing said brake piston and said brake adjustment pin together for unitary movement thereof, plug means engaging said cap to form a compartment therewith through which said brake adjustment pin extends, said cap having a bore therein connecting the axially outer end of said compartment to said brake cylinder and having an air vent therein connecting to the axial inner end of said compartment, a friction grip engaging said brake adjustment pin in said compartment, an auxiliary piston slidably engaging said brake adjustment pin and sealed in said compartment on the axially outer side of said friction grip, spring means in said compartment at the axially inner end thereof, and disc means engaging said spring means on one face thereof and engaging said piston on the other face thereof, said friction grip means engaging said other face of said disc means when the brake is released.

2. In a brake, a brake housing having a brake cylinder therein, a brake piston slidably received in said brake cylinder, a cap secured to said housing to close an end of said brake cylinder, means for setting up hydraulic pressure in said brake cylinder, a brake adjustment pin extending through said cap, means securing said brake piston and said brake adjustment pin together for unitary movement thereof, means engaging the outer end of said cap to form a cylinder compartment therewith through which said brake adjustment pin extends, a bore being provided connecting the axially outer end of said cylinder compartment to said brake cylinder, a friction grip engaging said brake adjustment pin in said compartment, an auxiliary piston slidably engaging about said brake adjustment pin and sealed in said cylinder compartment on the axially outer side of said friction grip, spring means in said cylinder compartment at the axially inner end thereof, and means engaging said spring means on one face thereof and engaging said piston on the other face thereof, said friction grip means engaging said other face of said last-named means when the brake is released.

3. In a brake, a brake housing having a brake cylinder therein, a brake piston slidably received in said brake cylinder, a cap secured to said housing to close an end of said brake cylinder, hydraulic pressure fluid being supplied to said brake cylinder, a brake adjustment pin extending through said cap, means securing said brake piston and said brake adjustment pin together for unitary movement thereof, means engaging said cap to form a compartment therewith through which said brake adjustment pin extends and to which said pressure fluid is supplied, a friction grip engaging said brake adjustment pin in said compartment, an auxiliary piston slidably engaging said brake adjustment pin and sealed in said compartment on the axially outer side of and engaging said friction grip, said auxiliary piston having a face thereof engaging an end wall of said compartment when the brake is released, and spring means in said compartment at the axially inner end therof and engaging said piston on the other face thereof.

4. In a brake, a brake housing having a brake cylinder therein, a brake piston in said brake cylinder, an automatic adjustment pin axially secured to and moveable with said brake piston, means forming an auxiliary cylinder at the outer end of said brake cylinder, which auxiliary cylinder has its axially outer end connected to said brake cylinder, said automatic adjustment pin extending through said auxiliary cylinder, an auxiliary piston received in said auxiliary cylinder about said pin, friction grip means engaging said automatic adjustment pin in said auxiliary cylinder to limit axially inward movement thereof, and spring means engaging said auxiliary piston to oppose movement thereof axially inwardly of the brake.

5. Brake means as in claim 4 where said spring means set up a predetermined form on said auxiliary piston on braking movement thereof, and said friction grip means continually engage said automatic adjustment pin with a greater force than said spring means exert on said auxiliary piston on braking action.

6. An automatic wear and deflection compensating brake including a rotary disc, a substantially C-shaped housing straddling a portion of the disc, a hydraulic piston slidably carried in a cylindrical opening by the housing for applying braking pressure to opposite sides of the disc in a direction tending to resiliently deflect the housing to a more open position, an automatic adjustment pin carried by the piston, a friction grip carried by the pin, an auxiliary piston engaging the grip and slidably received in a bore in the housing, the cylindrical opening and bore being hydraulically connected on the sides of the piston and the auxiliary piston remote from the disc, stop means in the housing limiting the movement of the auxiliary piston towards the disc, and compression spring means between the stop means and the auxiliary piston.

7. An automatic wear and deflection compensating brake including a rotary disc, a substantially C-shaped housing straddling a portion of the disc, a hydraulic piston slidably carried in a cylindrical opening by the housing for applying braking pressure to opposite sides of the disc in a direction tending to resiliently deflect the housing to a more open position, an automatic adjustment pin carried by the piston, a friction grip carried by the pin, an auxiliary piston engaging the grip and slidably received in a bore in the housing, means for applying hydraulic pressure to the sides of the piston and the auxiliary piston remote from the disc, stop means in the housing limiting the movement of the auxiliary piston towards the disc, and compression spring means between the stop means and the auxiliary piston.

8. An automatic wear and deflection compensating brake including a rotary disc, a substantially C-shaped housing straddling a portion of the disc, a hydraulic piston slidably carried in a cylindrical opening by the housing for applying braking pressure to opposite sides of the disc in a direction tending to resiliently deflect the housing to a more open position, an automatic adjustment pin carried by the piston, a friction grip carried by the pin, an auxiliary piston engaging the grip and slidably received in a bore in the housing, means for applying hydraulic pressure to the sides of the piston and the auxiliary piston remote from the disc, stop means in the housing limiting the movement of the auxiliary piston towards the disc, and compression spring means between the stop means and the auxiliary piston, the friction grip holding the pin with a force sufficiently strong to move the compression spring means to stop position, and the auxiliary piston being of a size so that when fluid pressure of more than about 300 p. s. i. is applied thereto the auxiliary piston is held towards the disc to more than counterbalance the force on the friction grip and the force of the compression spring means.

9. The combination in a hydraulic brake unit of a housing, a main piston and an auxiliary piston slidably received in separate bores in the housing, a rod carried by the main piston and extending slidably through the auxiliary piston, a friction grip carried by the auxiliary piston and engaging the rod, a stop on the housing adapted to be engaged by the auxiliary piston after limited movement, resilient means between the stop and auxiliary piston, and means for simultaneously applying fluid under pressure behind each piston.

References Cited in the file of this patent

UNITED STATES PATENTS

| | | |
|---|---|---|
| 2,392,970 | Bricker | Jan. 15, 1946 |
| 2,551,253 | Du Bois | May 1, 1951 |
| 2,720,286 | Bricker | Oct. 11, 1955 |
| 2,746,254 | Lucien | May 22, 1956 |